United States Patent
Yacoub

(10) Patent No.: US 9,394,834 B2
(45) Date of Patent: Jul. 19, 2016

(54) METHOD AND DEVICE FOR CONTROLLING AN INTERNAL COMBUSTION ENGINE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 13/941,152

(22) Filed: Jul. 12, 2013

(65) Prior Publication Data
US 2014/0014066 A1    Jan. 16, 2014

(30) Foreign Application Priority Data
Jul. 16, 2012 (DE) .......................... 10 2012 212 406

(51) Int. Cl.
| F02D 17/02 | (2006.01) |
|---|---|
| F02D 13/02 | (2006.01) |
| F02D 13/06 | (2006.01) |

(Continued)

(52) U.S. Cl.
CPC ............ *F02D 17/02* (2013.01); *F02D 13/0273* (2013.01); *F02D 13/06* (2013.01); *F02D 41/0087* (2013.01); *F02D 41/0235* (2013.01); *F02D 41/1446* (2013.01); *F02D 41/402* (2013.01); *F02D 41/025* (2013.01); *F02D 41/0275* (2013.01); *F02D 2041/001* (2013.01); *F02D 2041/389* (2013.01); *F02D 2200/602* (2013.01); *F02P 5/045* (2013.01); *F02P 5/145* (2013.01); *F02P 9/002* (2013.01); *Y02T 10/18* (2013.01); *Y02T 10/44* (2013.01)

(58) Field of Classification Search
CPC ..... F02D 17/02; F02D 13/0273; F02D 13/06; F02D 41/0087; F02D 41/0235; F02D 41/1446; F02D 41/402; F02D 41/0275; F02D 2009/0245; F02D 17/00; F02D 17/023; F02P 5/045; F02P 5/145; F02P 9/002; Y02T 10/18; Y02T 10/44; Y02T 41/025; Y02T 41/0275; Y02T 2041/001; Y02T 2041/389; Y02T 2200/602; F01N 3/0842; F01N 2610/02; F01N 3/2066; F01N 3/26; F02B 3/06
See application file for complete search history.

(56) References Cited

U.S. PATENT DOCUMENTS

| 4,815,423 A | 3/1989 | Holmér |
|---|---|---|
| 5,050,378 A | 9/1991 | Clemmens |

(Continued)

FOREIGN PATENT DOCUMENTS

| DE | 4236899 A1 | 5/1994 |
|---|---|---|
| DE | 19653231 A1 | 6/1998 |

(Continued)

*Primary Examiner* — Hung Q Nguyen
*Assistant Examiner* — Brian P Monahon
(74) *Attorney, Agent, or Firm* — Julia Voutyras; Alleman Hall McCoy Russell & Tuttle LLP

(57) ABSTRACT

A system is disclosed herein for a four-stroke internal combustion engine, the system comprising: at least two cylinders; a fuel direct injection device; a variable valve timing system; an engine controller to control spark ignition and valve timing according to load; wherein, below a lower load threshold, a first cylinder is deactivated, an injection of fuel takes place into a combustion chamber of the first cylinder and an outlet valve of the first cylinder is open during a compression stroke. Fuel injected into the deactivated cylinders may enter the exhaust tract through the open outlet valves and serve as a reducing agent therein.

17 Claims, 5 Drawing Sheets

(51) Int. Cl.

| | |
|---|---|
| *F02D 41/00* | (2006.01) |
| *F02D 41/02* | (2006.01) |
| *F02D 41/14* | (2006.01) |
| *F02D 41/40* | (2006.01) |
| *F02D 41/38* | (2006.01) |
| *F02P 5/04* | (2006.01) |
| *F02P 9/00* | (2006.01) |
| *F02P 5/145* | (2006.01) |

(56) References Cited

U.S. PATENT DOCUMENTS

| | | | |
|---|---|---|---|
| 7,143,727 B1 * | 12/2006 | Winstead | F01L 9/04 123/198 F |
| 2004/0000282 A1 | 1/2004 | Kataoka et al. | |
| 2005/0131618 A1 * | 6/2005 | Megli | F02D 13/0215 701/101 |
| 2005/0182553 A1 * | 8/2005 | Miller | F01L 1/46 701/103 |
| 2006/0130460 A1 * | 6/2006 | Warner | F02D 35/023 60/286 |
| 2006/0150616 A1 * | 7/2006 | O'Connor | F01N 3/023 60/285 |
| 2008/0149053 A1 * | 6/2008 | Harmon | F01L 9/023 123/90.12 |
| 2011/0126799 A1 | 6/2011 | Zurn | |
| 2011/0209685 A1 | 9/2011 | Shane et al. | |

FOREIGN PATENT DOCUMENTS

| | | |
|---|---|---|
| DE | 102004001249 A1 | 8/2005 |
| WO | 2006025958 A1 | 3/2006 |

* cited by examiner

| Cylinder 204 | | | Cylinder 208 | | | Cylinder 210 | | | Cylinder 206 | | |
|---|---|---|---|---|---|---|---|---|---|---|---|
| stroke | Inlet valve | Outlet valve | stroke | Inlet valve | Outlet valve | stroke | Inlet valve | Outlet valve | stroke | Inlet valve | Outlet valve |
| intake | open | closed | exhaust | closed | open | expansion | closed | closed | compression | closed | closed |
| compression | closed | open | intake | open | closed | exhaust | closed | open | expansion | closed | closed |
| expansion | closed | closed | compression | closed | closed | intake | open | closed | exhaust | closed | open |
| exhaust | closed | open | expansion | closed | closed | compression | closed | open | intake | open | closed |

| Cylinder 204 | | | | Cylinder 208 | | | | Cylinder 210 | | | | Cylinder 206 | | | |
|---|---|---|---|---|---|---|---|---|---|---|---|---|---|---|---|
| stroke | Pre | Main | Post | stroke | Pre | Main | Post | stroke | Pre | Main | Post | stroke | Pre | Main | Post |
| intake | - | - | - | exhaust | - | - | - | expansion | - | - | - | compression | + | + | - |
| compression | + | + | +/- | intake | + | + | - | exhaust | - | - | - | expansion | - | - | +/- |
| expansion | - | - | - | compression | + | + | - | intake | - | - | - | exhaust | - | - | - |
| exhaust | - | - | - | expansion | - | - | - | compression | + | + | +/- | intake | - | - | - |

FIG. 4

METHOD AND DEVICE FOR CONTROLLING AN INTERNAL COMBUSTION ENGINE

CROSS REFERENCE TO RELATED APPLICATIONS

The present application claims priority to German Patent Application No. 102012212406.3, filed on Jul. 16, 2012, the entire contents of which are hereby incorporated by reference for all purposes.

TECHNICAL FIELD

The disclosure relates to a method and a device for controlling an internal combustion engine.

BACKGROUND AND SUMMARY

Exhaust systems of internal combustion engines are generally fitted with an exhaust-gas aftertreatment device which may comprise in particular one or more catalytic converters, for example an oxidation catalytic converter. For optimum functioning, many exhaust-gas aftertreatment devices utilize, at least intermittently, an exhaust-gas temperature higher than that attained during normal operation of the internal combustion engine. The required temperature increase may be realized for example by an exothermic reaction of unburned fuel, which is contained in the exhaust-gas flow, on an oxidation catalytic converter element.

For the enrichment of the exhaust-gas flow with fuel, it is known for fuel to be injected directly into a cylinder of the internal combustion engine a post-injection which takes place after the actual combustion process. The problem may however arise here that some of the injected fuel passes into and thins the engine oil used for lubricating the internal combustion engine, such that the lubricating action of the engine oil is diminished.

Therefore, fuel is normally injected directly into an exhaust tract of the internal combustion engine for the enrichment of the exhaust-gas flow with fuel. For this purpose, an injection nozzle is provided with fuel that is at a relatively low pressure of typically 5 to 10 bar, injected directly into the exhaust-gas flow or sprayed onto a heating element which assists an evaporation of the fuel before it is introduced into the exhaust-gas flow. The injection system required for this purpose increases the complexity and the costs of the overall system.

In U.S. Pat. No. 4,815,423 and US 2011/0126799 A1, an outlet valve is opened during a part of the compression stroke of a cylinder in order to discharge some of the air contained in the combustion chamber. The outlet valve is subsequently closed, the remaining air is compressed, and fuel is introduced into the cylinder and ignited. In this way, an enrichment of the exhaust-gas flow with fuel is not realized.

It is an object of the present disclosure to propose a method and a system for controlling an internal combustion engine, in which method and system an exhaust-gas flow is enriched with fuel, wherein the disadvantages mentioned above should as far as possible be avoided.

In a method according to the disclosure for controlling an internal combustion engine which has at least one first cylinder, it is provided that, during a compression stroke of the at least one cylinder, an outlet valve of the first cylinder is open for the introduction of a fuel-air mixture from a combustion chamber of the cylinder into an exhaust tract of the internal combustion engine. The internal combustion engine is in particular an applied-ignition engine. Here, the fuel-air mixture may have been produced outside the combustion chamber of the cylinder, for example, an intake pipe injection, and introduced into the combustion chamber; the mixture may however also have been produced by a direct injection of fuel into the combustion chamber. If the internal combustion engine has an exhaust-gas recirculation system, the fuel-air mixture may contain at least a fraction of recirculated exhaust gas. Furthermore, the outlet valve may be open during a discharge stroke of the at least one cylinder.

By virtue of the fact that the outlet valve of the cylinder is, according to the disclosure, open at least for part of the duration of the compression stroke, the mixture situated in the combustion chamber of the cylinder can pass into the exhaust tract. In particular, the movement of the piston of the cylinder during the compression stroke, said movement taking place in a direction for a reduction in the volume of the combustion chamber, causes the mixture to be forced into the exhaust tract of the internal combustion engine, for example into an exhaust manifold, from where said mixture passes for example into an exhaust-gas aftertreatment device. An enrichment of the exhaust-gas flow with unburned fuel may be attained in this way, whereby for example improved operation of an exhaust-gas aftertreatment device and/or an increase in the exhaust-gas temperature at an oxidation catalytic converter element may be attained. Furthermore, opening of the exhaust valve during the compression stroke may allow for release of unburned fuel into the exhaust tract nearly immediately, minimizing possible accumulation on combustion chamber walls and may further allow the timing of release of the unburned into the exhaust tract to preempt exhaust blowdown by adjacent cylinders. This may provide a reservoir of unburned fuel to act as a reducing agent within an exhaust gas aftertreatment device prior to exhaust of $NO_x$ and other emissions by adjacent cylinders.

In addition to the at least one first cylinder which is operated as described above, the internal combustion engine particularly preferably has at least one further, second cylinder which is operated in the normal mode, that is to say the outlet valve of the second cylinder is closed during the compression stroke. By virtue of the fact that the outlet valve of the first cylinder is substantially open during the compression stroke and the fuel-air mixture is conducted into the exhaust tract, it is the case that, at the end of the compression stroke, no mixture, or an insufficient amount of mixture for power generation in the expansion stroke, is available in the combustion chamber of the first cylinder. In the case of an applied-ignition engine in particular, it may also be provided that no ignition takes place. The first cylinder is thus not utilized for the power generation of the internal combustion engine, and is thus "deactivated". A selective cylinder deactivation is realized by the opening of the outlet valve during the compression stroke of the first cylinder. By virtue of the fact that the first cylinder is deactivated and the second is operated in the normal mode and is thus utilized for power generation, correspondingly changed control of the fuel injection into the second cylinder is necessary in order to obtain a torque or power which corresponds to the torque or the power that would be output by the internal combustion engine if the first cylinder were also being operated in the normal mode. It is possible in this way to avoid less efficient part-load operation of the second cylinder.

The internal combustion engine preferably comprises an even number of cylinders, in particular at least four cylinders, wherein a selective cylinder deactivation is realized by opening of the outlet valve of each odd-numbered cylinder during a compression stroke of the respective cylinder. The odd-numbered cylinders are therefore utilized not for power generation but rather for enriching the exhaust-gas flow with fuel, whereas the even-numbered cylinders are operated in the normal mode and generate the mechanical power for driving the drivetrain and the odd-numbered cylinders. A particularly efficient enrichment of the exhaust-gas flow with fuel is attained in this way. As described above, the selective cylinder deactivation may be performed for a number of strokes or for a time period which is dependent on the enrichment of the exhaust gas required for the operation of the exhaust-gas aftertreatment device. The selective cylinder deactivation may also be dependent on the power demand or the load of the internal combustion engine.

A system is disclosed herein for a four-stroke internal combustion engine, the system comprising: at least two cylinders; a fuel direct injection device; a variable valve timing system; an engine controller to control spark ignition and valve timing according to load; wherein, below a lower load threshold, a first cylinder is deactivated, an injection of fuel takes place into a combustion chamber of the first cylinder and an outlet valve of the first cylinder is open during a compression stroke. Fuel injected into the deactivated cylinders may enter the exhaust tract through the open outlet valves and serve as a reducing agent therein.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

BRIEF DESCRIPTION OF THE DRAWINGS

FIG. 4 tabulates example valve timing and fuel injection during a selective cylinder deactivation mode.

DETAILED DESCRIPTION

Figure 1:
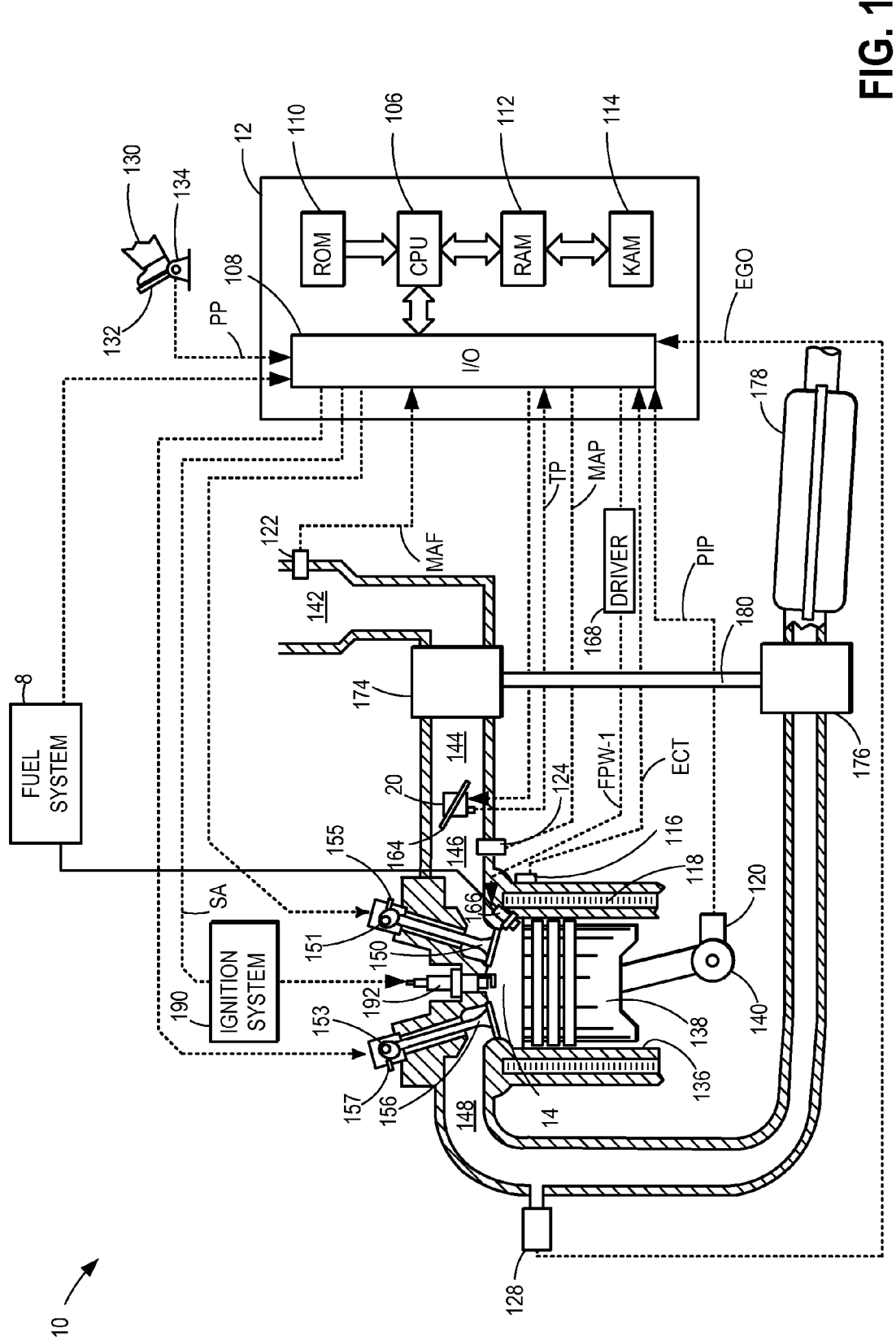
FIG. 1 shows an example cylinder of an internal combustion engine in accordance with the present disclosure.
Figure 2:
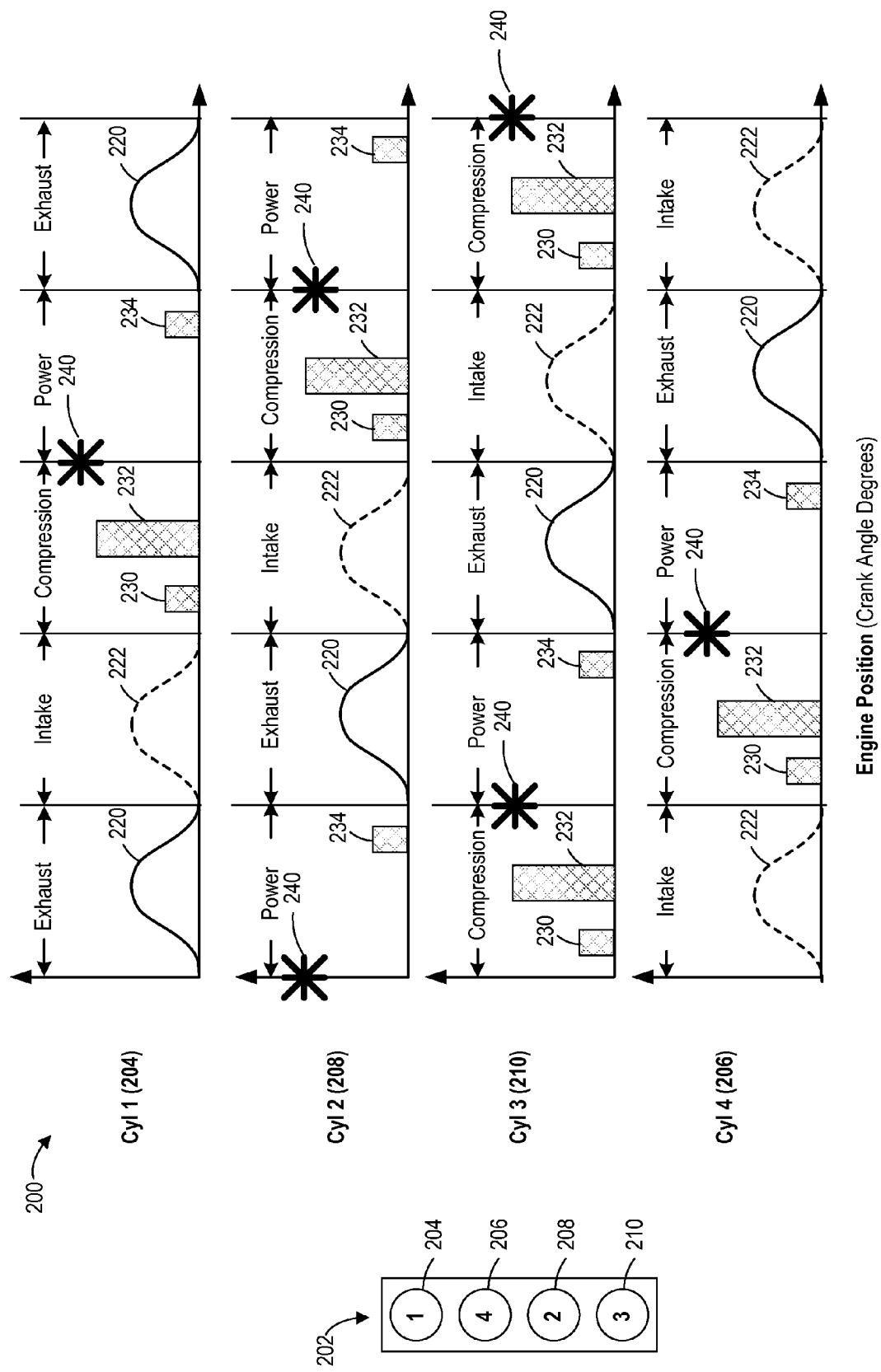
FIG. 2 shows an example map of valve timing and piston position with respect to fuel injection during normal operation.
Figure 3:
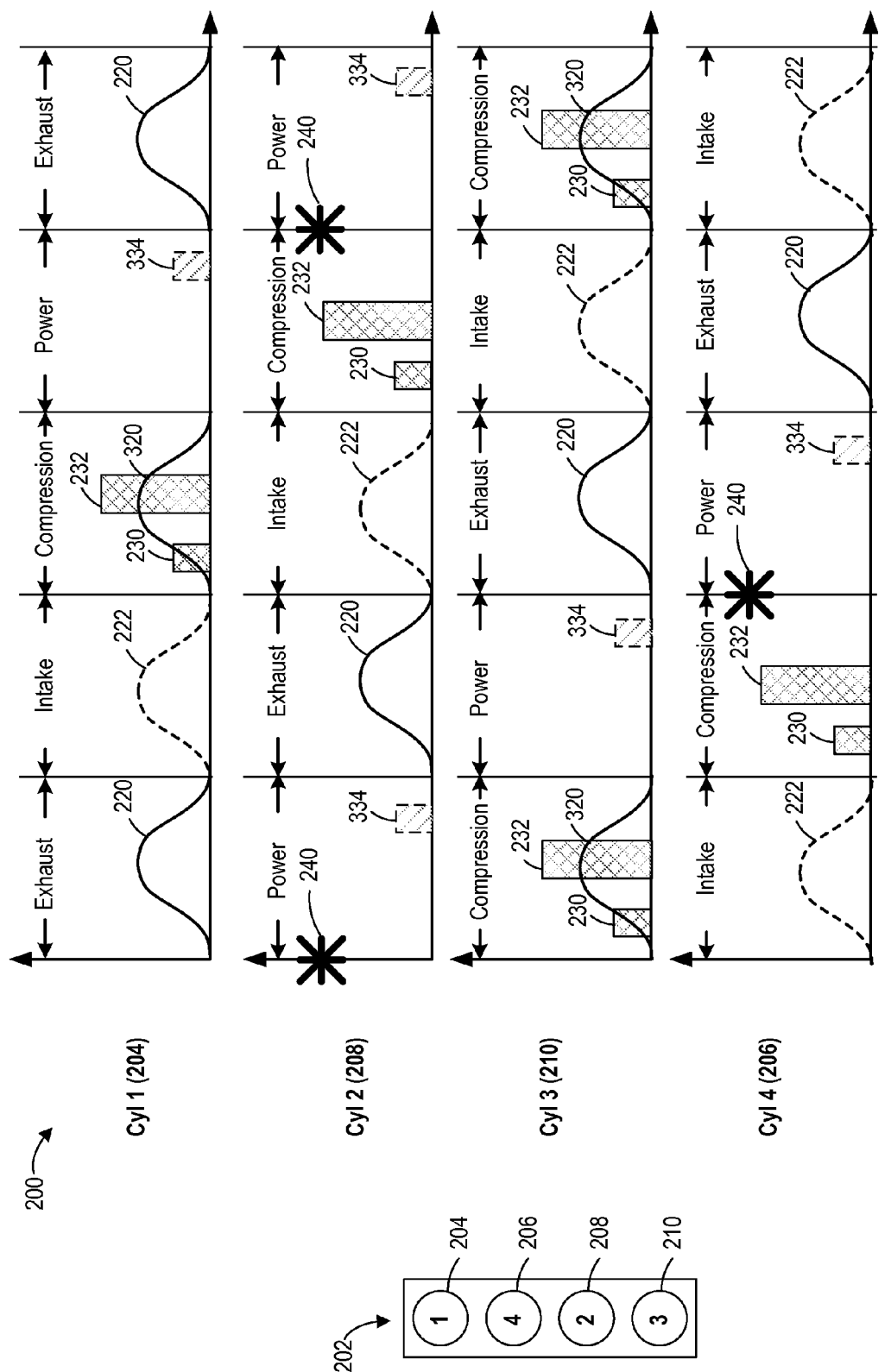
FIG. 3 shows example map of valve timing and position with respect to fuel injection during a selective cylinder deactivation mode.
Figure 5:
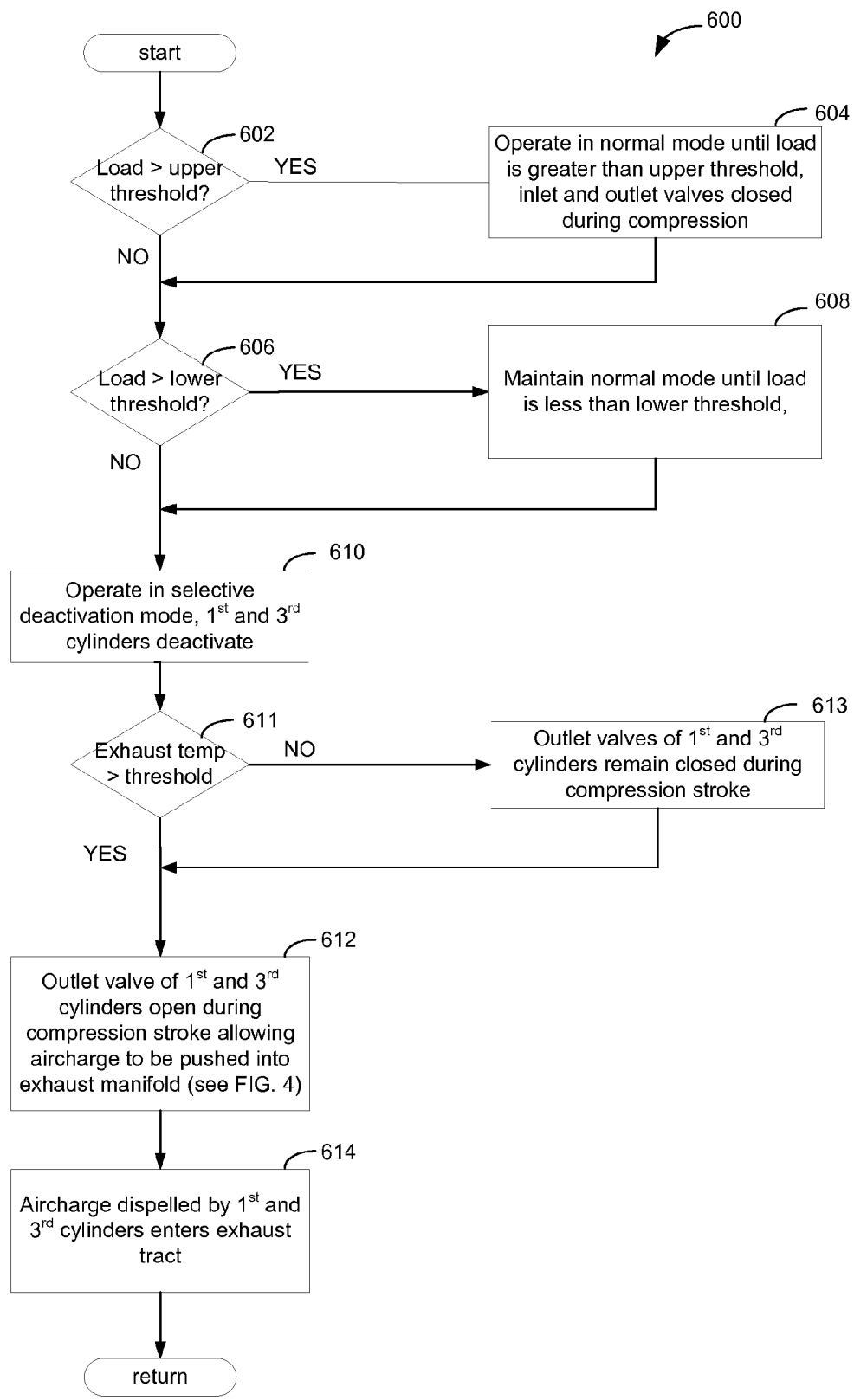
FIG. 5 shows a flowchart of a method in accordance with the present disclosure.

The method and systems of the present disclosure will be described in greater detail below in reference to the FIGS. FIG. 1 shows a schematic depiction of an engine. FIG. 2 shows the valve timing and fuel injection scheme for an engine in accordance with the disclosure in the normal mode, when four cylinders are active. FIG. 3 shows the valve timing and fuel injection scheme for an engine in accordance with the present disclosure in a selective deactivation mode where cylinder 1 and 3 are not utilized for power supply. FIG. 4 shows the injection of fuel and valve openings in a table form for a selective cylinder deactivation mode. FIG. 5 is a flow chart diagramming a method of the present disclosure.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

A device according to the disclosure for controlling an internal combustion engine comprises an actuation device for actuating at least one outlet valve of a first cylinder of the internal combustion engine and comprises an electronic control unit which is designed to control the actuation device of the outlet valve such that, during a compression stroke of the first cylinder, an outlet valve of the first cylinder is open for the introduction of a fuel-air mixture from a combustion chamber of the first cylinder into an exhaust tract of the internal combustion engine. The actuation device of the outlet valve may for example be of mechanical, hydraulic or electromagnetic form and can be controlled by the electronic control unit via corresponding lines. The electronic control unit may be part of an electronic engine controller.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

The internal combustion engine preferably has a direct injection device, wherein an injection of fuel into the combustion chamber of the at least one cylinder takes place during the compression stroke. The injection system of the internal combustion engine comprises at least one injection nozzle for the direct injection of fuel into the combustion chamber of the at least one cylinder and may furthermore comprise an injection pump and corresponding lines and a controller for activating the injection valve and the pump. The injection of fuel takes place in particular during a time period which is short in relation to the duration of the compression stroke, that is to say in relation to the duration of the compression movement of the piston, and said injection of fuel may for example take the form of a main injection or be similar to a main injection of an injection process broken down into multiple partial injections. The mixture of fuel and air is produced by the direct injection of the fuel into the combustion chamber during the compression stroke and is at least partially introduced into the exhaust system owing to the opening of the outlet valve. If the outlet valve is closed before the end of the compression stroke, the fuel injection takes place before the closing of the outlet valve. In this way, it is made possible in a particularly simple and effective manner for the exhaust-gas flow to be enriched with fuel.

The internal combustion engine comprises in particular a direct injection device 166. The electronic control unit 12 may be designed to control a fuel injection device of the first cylinder such that fuel is injected during the compression stroke and, in this way, the fuel-air mixture which is conducted into the exhaust tract is produced. In the case of an applied-ignition engine, the device according to the disclosure is preferably also designed for corresponding control of an ignition system of the internal combustion engine, wherein it may be provided that no ignition takes place in the first cylinder after a compression stroke during which the outlet valve was open. The internal combustion engine preferably comprises a second cylinder which is operated in the normal mode, and thus utilized for power generation, while the first cylinder is not utilized for power generation, or comprises an even number of cylinders of which each even-numbered cylinder is operated in the normal mode and each odd-numbered cylinder is deactivated. The device for controlling the internal combustion engine comprises corresponding actuation device for actuating the outlet valves of the cylinders and comprises an electronic control unit which is designed for controlling the actuation device.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine 10 may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Turning now to FIG. 2, for each cylinder, the normal mode is presented, in which the cylinder is utilized for power generation and is thus not deactivated. In the example illustrated, each cylinder has an inlet valve and an outlet valve (also referred to as an intake and exhaust valve respectively), wherein the provision of a single inlet valve and a single outlet valve per cylinder is generally sufficient, though additional inlet and outlet valves may be provided. The fuel injection is broken down into a pre-injection (pilot injection), a main injection and a post-injection; the main injection in particular may be divided into a plurality of further partial injections. During the intake stroke, the inlet valve of each cylinder is open and the outlet valve is closed; an injection of fuel does not take place. During the compression stroke, both valves are closed, wherein the pilot and the main injection take place. During the expansion stroke, both valves remain closed; a post-injection may take place here. Finally, in the exhaust stroke, the inlet valve remains closed while the outlet valve is opened in order to discharge the exhaust gas into the exhaust tract of the internal combustion engine; an injection of fuel does not take place in the exhaust stroke.

In FIG. 2 an example map of valve timing and piston position with respect to fuel injection during normal engine operation is shown for reference. FIG. 2 shows a graph 200 of example valve timing and piston position with respect to an engine position (crank angle degrees) within the four strokes (intake, compression, power and exhaust) of the engine cycle for four cylinder engine 202 with a firing order of 1-2-3-4 (e.g., 204, 208, 210, 206, respectively). During operation, piston 36 gradually moves downward from top-dead-center (TDC), bottoming out at bottom-dead-center (BDC) by the end of the intake stroke. The piston then returns to the top, at TDC, by the end of the compression stroke and then again moves back down, towards BDC, during the power stroke (herein also referred to as expansion stroke), returning to its original top position at TDC by the end of the exhaust stroke. Curves 220 and 222 depict valve lift profiles during normal engine operation for exhaust and intake valves, respectively. An exhaust valve may be opened just as the piston bottoms out at the end of the power stroke. The exhaust valve may then close as the piston completes the exhaust stroke, and remain open at least until a subsequent intake stroke of the following cycle has commenced. In the same way, an intake valve may be opened at or before the start of an intake stroke, and may remain open at least until a subsequent compression stroke has commenced.

During the normal operating mode shown in FIG. 2, each cylinder is utilized for power generation and is thus not deactivated in the manner described in greater detail below. In this mode, fuel injection is broken down into a pre-injection (or pilot injection), a main injection and a post-injection; and in some embodiments, the main injection may be divided into a plurality of further partial injections. During the intake stroke, the inlet valve of each cylinder is open and the outlet valve is closed; an injection of fuel does not take place. During the compression stroke, both valves are closed, wherein the pre-injection and the main injection take place. During the expansion stroke, both valves remain closed; a post-injection may take place here. Finally, in the exhaust stroke, the inlet valve remains closed while the outlet valve is opened in order to discharge the exhaust gas into the exhaust tract of the internal combustion engine; during normal engine operations, an injection of fuel does not take place during the exhaust stroke. It should be appreciated that the cylinder operation described herein occurs with overall positive engine output torque, such that the cylinders are not providing engine braking, such as so-called Jake brake operation.

As shown in FIG. 2, normal engine operation includes operating the cylinders with a main injection 232 during the compression stroke. Furthermore, the injection process may comprise partial injections in addition to the main injection, wherein the fuel amount supplied during the one or more partial injections is considerably smaller than that supplied during the main injection. Therefore, during every stroke of the engine, a pre-injection 230, main injection 232 and post-injection 234 takes place within the cylinders. As such, the individual injections to the various cylinders do not overlap, and there remains sufficient time available for the opening and closing of the injection valves and for the supply of highly pressurized fuel to the injection valves. During the compression stroke which follows the intake stroke, the inducted air-fuel mixture or the inducted air is compressed by an upward movement of the piston. In the case of an applied-ignition engine, ignition event 240 is performed by means of an ignition spark when the piston is in the vicinity of the top dead center. The ignited mixture forces the piston downward during the expansion stroke, which is also referred to herein as the power stroke. During the power stroke, work is done that generates power within the engine. Subsequently, the exhaust stroke follows the expansion stroke or working stroke, and serves to discharge the burned mixture into the exhaust system by an upward movement of the piston. Thereby, during normal engine operation, each cylinder generates power during the working stroke of the cylinder, which is the expansion or power stroke. In some instances, the normal operating mode is referred to as an engine powering mode since each cylinder of the engine performs work that generates power during the engine drive cycle.

In the case of a four-cylinder engine, the individual strokes and piston movements are offset from one cylinder to the next in each case. The chronological sequence of the four strokes of the four cylinders of a four-cylinder four-stroke engine is illustrated in FIG. 2. Here, the chronological sequence of the individual strokes of the second cylinder (cylinder 2) is offset in relation to that of the first cylinder (cylinder 1) such that the intake stroke of the second cylinder takes place during the compression stroke of the first cylinder. Likewise, the intake stroke of the cylinder 3 takes place during the compression stroke of the cylinder 2, the intake stroke of cylinder 4 takes place during the compression stroke of cylinder 3, and the intake stroke of cylinder 1 takes place during the compression stroke of cylinder 4. In this way, the other strokes are offset with respect to one another correspondingly, such that one cylinder is in the expansion stroke in which said cylinder outputs work and drives the other cylinders and the drivetrain. In FIG. 2, cylinders 1 to 4 are presented in the 1-2-3-4 ignition sequence. However, the geometric arrangement of the cylinders within the engine may be different.

With regard to the method according to the present disclosure, FIG. 3 shows an example map of valve timing and piston position with respect to an engine operating in a selective cylinder deactivation mode. The cylinders 1 and 3 in the firing order are deactivated in that they do not provide power to the engine. Deactivation may comprise omitting spark ignition. When the first and third cylinders are deactivated an exhaust valve may open during a compression stroke of the first and third cylinders which causes the fuel-air mixture to be forced into exhaust tract of the internal combustion engine. For example, said mixture may pass into exhaust passage 48 and further into an exhaust-gas aftertreatment device such as emission control device 70. In this way, an enrichment of the exhaust-gas flow with unburned fuel can be attained in a particularly simple and effective manner, whereby for example improved operation of an exhaust-gas aftertreatment device and/or an increase in the exhaust-gas temperature at an oxidation catalytic converter element can be attained. In particular, an additional injection system for injecting fuel into the exhaust system is not required. Additionally, with exhaust valve opening of the deactivated cylinders during the compression stroke as a pilot and main fuel injection are occurring may increase a quantity of fuel available to the exhaust gas aftertreatment device. Also, immediate release of unburned fuel into the exhaust system may minimize accumulation of fuel particles and thus wear on the inner walls of the combustion chamber. Opening of the outlet valve during the compression stroke may further be used in the control of timing of the release of unburned fuel into the exhaust gas system, such that a compression stroke of the deactivated cylinder may preempt the exhaust stroke of an active cylinder and the method of the present disclosure may be used to effectively preload an exhaust gas aftertreatment device with a reducing agent.

Turning to FIG. 3, an example map of valve timing and piston position with respect to fuel injection during a selective cylinder deactivation mode operation is shown. Features are generally the same as indicated in FIG. 2 with the exception of the post-injection and additional exhaust valve opening as described below. As describe above, each of the cylinders is presented in their firing order and the valve openings and fuel injections indicated as they occur during engine strokes. A notable difference between the normal operating mode (shown in FIG. 2) and the selective cylinder deactivation mode is the additional exhaust valve opening 320 for the deactivated cylinders during the compression stroke. Furthermore, the post-injection 334 may be altered in the deactivated cylinders. Opening of the exhaust (herein also referred to as outlet) valve during the compression stroke allows injected fuel to enter the exhaust gas system and act as a reducing agent within exhaust gas aftertreatment devices therein. Because the unburned fuel is released into the exhaust gas system a lesser quantity of fuel may be injected. Furthermore, post injection of fuel may be rendered moot as unburned fuel has already been admitted into the exhaust gas system and no combustion of fuel is taking place, as such the post injection 334 may be reduced in quantity or time compared to a post-injection in the normal mode of operation. In some embodiments, the post-injection may be omitted entirely.

In one embodiment of the method according to the disclosure, the outlet valve of the at least one cylinder is open for substantially the entire duration of the compression stroke of the first cylinder. The outlet valve may thus in particular be opened at the start of the compression stroke, that is to say in the region of the bottom dead center of the piston movement in the case of a reciprocating-piston engine, and closed upon the end of the compression stroke, that is to say in the region of the top dead center. A particularly simple implementation of the method and a particularly complete introduction of the fuel-air mixture into the exhaust tract of the internal combustion engine are made possible in this way.

Turning to FIG. 4, tables are shown indicating during which stroke valve opening and fuel injections may occur during the selective cylinder deactivation mode. In the control of the valves according to the disclosure, it is the case, by contrast to the normal operating mode, that the outlet valve of the first cylinder is at least temporarily open during the compression stroke (printed in bold in the upper table of FIG. 4). In this way, a connection is produced between the combustion chamber of the first cylinder and the exhaust tract of the internal combustion engine, and the fuel-air mixture produced in the combustion chamber is forced into the exhaust tract by the upward movement of the piston.

As specified in the lower table of FIG. 4, the pre-injection of fuel and the main injection of fuel into the combustion chamber of the cylinder take place during the compression stroke of the first cylinder as in normal operation; it is however possible, for example, for the injection time, duration and amount to be adapted according to the requirements for enrichment of the exhaust-gas flow with fuel. In the other strokes, the valve positions are the same as in normal operation. During the expansion stroke, it is possible, if appropriate, for a post-injection of fuel to take place for additional enrichment of the exhaust-gas flow with fuel. Here, the cylinder 1 is thus not utilized for power generation and, in this sense, is deactivated.

It may advantageously be provided that a post-injection of the fuel into the combustion chamber of the first cylinder takes place during an expansion stroke, following the compression stroke of the first cylinder. Said post-injection may, for example, serve for the enrichment of the exhaust gas with fuel in order to improve the operation of an exhaust-gas aftertreatment system.

As presented by way of example in FIG. 3, it is possible in particular for two cylinders of the four-cylinder engine, cylinders 204 and 210 in the example, to be operated in the stated manner. Said cylinders do not contribute to the power generation of the engine. The other cylinders, cylinders 206 and 208 in the example, are operated in the normal mode and thus generate the power that can be extracted from the engine and which is also required for driving the two deactivated cylinders. Here, the amount of fuel injected by cylinders 206 and 208 is adapted to the increased torque that must be generated by said cylinders owing to the deactivation of cylinders 204 and 210.

It is furthermore preferable for the outlet valve of the at least one cylinder to be open for a number of compression strokes of the cylinder, said number being dependent on a sensor signal of the exhaust system. It may be provided in particular that an opening of the outlet valve of the cylinder is triggered for one compression stroke or for a multiplicity of successive compression strokes on the basis of a signal, from a temperature sensor in the exhaust system, which indicates an exhaust-gas temperature too low for optimum operation of the exhaust-gas aftertreatment device. Furthermore, for example in the case of a direct injection, an adaptation of the injected fuel amount may be performed in accordance with the sensor signal. Operation of the cylinder with the outlet valve closed during the compression stroke, that is to say normal operation, may also be provided. Optimum operation of the exhaust-gas aftertreatment device of the internal combustion engine is made possible in this way, wherein at the same time the least possible intervention is made into the operation and the power generation of the internal combustion engine.

It should be appreciated that though the examples in FIG. 2-4 depict a four cylinder engine the system and method of the present disclosure may be applied to any engine with an even number of cylinder. As such, cylinders herein may be referred to as a first and second cylinder. In this case the first cylinder may also represent an odd-numbered cylinder in an engine with more than two cylinders and the second cylinder may present an even numbered cylinder of the same engine. In the example, of a four cylinder engine the first and second cylinder pair is repeated twice such that a first cylinder comprises a first and third cylinder and a second cylinder comprises a second and fourth cylinder. However, the object of the disclosure may be applied to 6, 8, 10, or 12 cylinder engines as examples.

Turning now to FIG. 5, a flow chart diagramming a method in accordance with the present disclosure is shown. A method in accordance with the present disclosure may be carried out by engine controller 12 as stored in read-only memory 110. The engine controller 12 may furthermore be suited to control spark ignition via ignition system 190 and exhaust valve (herein also referred to as outlet valve) timing via cam actuation system 153 (shown in FIG. 1) in accordance with the method of the present disclosure. The method 600 starts and proceeds to 602 where it is assessed if the load on the engine is greater than an upper load threshold. If the load is greater than an upper threshold (YES), the method proceeds to 604 where the engine is operated in a normal mode with both the inlet and outlet valves of a cylinder closed during the compression stroke of the cylinder (as in FIG. 2).

If at 602, the load is not greater than an upper load threshold (NO), the method proceeds to 606. At 606, it is determined if the load is greater than a lower threshold. If the load is greater than a lower threshold (YES) the method proceeds to 608 where the normal mode is maintained until the load does not exceed the lower threshold. It should be appreciated the upper and lower threshold may be the same threshold, or the values may differ based on the displacement, compression ratio, power output and other parameters of the cylinders.

If at 606, the load is not greater than the lower threshold (NO) the method proceeds to 610 where the engine is operated in the selective deactivation mode. In a four cylinder engine the first and third cylinders in a firing order may be deactivated. Deactivation of the cylinders may entail discontinuing spark ignition in the example of an applied ignition engine. Furthermore, alterations to the timing and number of fuel injections may be made in the deactivated cylinders. For example, the quantity of fuel injected may be reduced during a selective deactivation mode. Regardless of load, the second and fourth cylinders still power the engine and the outlet valves of the second and fourth cylinders are subsequently closed during the compression stroke At 611, it is assessed if the temperature in the exhaust tract is greater than a threshold temp. The threshold temp may be a temperature below which effective reduction of $NO_x$ in an exhaust aftertreatment device may not occur. If the temperature in the exhaust tract is not greater than a threshold (NO) the method continues to 613 where the outlet valve of the first and third cylinder remain closed during the compression stroke. If at 611, the exhaust temperature is above a threshold temperature the method proceeds to 612. Furthermore, as the method in accordance with the present disclosure is repeated if the temperature within the exhaust tract falls below the threshold temperature the outlet valves may be closed. With a temperature below a threshold temperature the fuel released through the outlet valve may not be useful as a reductant as conditions may not be suited for the reduction of $NO_x$ in an exhaust gas aftertreatment device. In this way outlet valve opening during the compression stroke of the disabled odd-numbered cylinders may be disabled when a temperature in an exhaust tract is below a threshold. Furthermore, below a threshold temperature, fuel injection into the deactivated cylinders may be reduced or stopped.

At 612, while the engine is in a selective deactivation mode, the outlet valves of the first and third cylinders are open for, at least a partial duration of the compression stroke. This opening of the outlet valve during the compression stroke allows the air fuel mixture in the first and third, deactivated cylinders to be pushed into the exhaust manifold as the piston moves up within the cylinder. At 614, the aircharge dispelled into the exhaust manifold from the first and third cylinders enters the exhaust tract. The unburned fuel entering the exhaust track may serve as a reductant in exhaust gas aftertreatment systems or to enrich the airflow into the intake manifold via exhaust gas recirculation. The method then returns.

In this way four cylinders may be operated such that, below a lower load threshold, each odd-numbered cylinder in a firing order is not utilized for power generation, and wherein, during a compression stroke of each odd-numbered cylinder, an injection of fuel takes place into a combustion chamber of the odd-numbered cylinders and an outlet valve of the odd-numbered cylinders is open during the compression stroke of the odd number cylinders to make an air-fuel mixture thereby produced available to an exhaust tract. A reduction in fuel consumption and exhaust-gas emissions can hereby be attained in particular in all load ranges.

A system is disclosed herein for a four-stroke internal combustion engine, the system comprising: at least two cylinders; a fuel direct injection device; a variable valve timing system; an engine controller to control spark ignition and valve timing according to load; wherein, below a lower load threshold, a first cylinder is deactivated, an injection of fuel takes place into a combustion chamber of the first cylinder and an outlet valve of the first cylinder is open during a compression stroke. Fuel injected into the deactivated cylinders may enter the exhaust tract through the open outlet valves and serve as a reducing agent therein.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a four-stroke internal combustion engine comprising:
   at least two cylinders;
   a fuel direct injection device;
   a variable valve timing system; and
   a control system with computer readable non-transitory instructions stored in memory and executable by a processor to:
      below a lower load threshold, deactivate a first cylinder; and
      during a compression stroke of the first cylinder while the first cylinder is deactivated, inject fuel into a combustion chamber of the first cylinder and open an outlet valve of the first cylinder, wherein the outlet valve of the first cylinder is open for an entire duration of the compression stroke of the first cylinder.

2. The system as claimed in claim 1, wherein the control system further comprises computer readable non-transitory instructions stored in memory and executable by the processor to post-inject fuel during an expansion stroke of the first cylinder.

3. The system as claimed in claim 1, wherein the first cylinder is deactivated by discontinuing spark ignition.

4. The system as claimed in claim 1, further comprising a second cylinder which is active, even below the lower load threshold, wherein the control system further comprises computer readable non-transitory instructions stored in memory and executable by the processor to close an outlet valve of the second cylinder during a compression stroke of the second cylinder.

5. The system as claimed in claim 1, wherein the at least two cylinders comprise four cylinders.

6. The system as claimed in claim 5, wherein the four cylinders include the first cylinder, the second cylinder, a third cylinder, and a fourth cylinder, and wherein the control system further comprises computer readable non-transitory instructions stored in memory and executable by the processor to deactivate the third cylinder below the lower load threshold, and, during a compression stroke of the third cylinder, inject fuel into a combustion chamber of the third cylinder and open an outlet valve of the third cylinder.

7. A method for an engine, comprising:
   above an upper load threshold, maintaining an outlet valve of a first cylinder closed during a full compression stroke;
   below a lower load threshold, deactivating the first cylinder and opening the outlet valve during a compression stroke, wherein the outlet valve of the first cylinder is open for an entire duration of the compression stroke of the first cylinder, and injecting fuel into the first cylinder during the compression stroke; and
   regardless of load, maintaining an outlet valve of a second cylinder closed during a full compression stroke.

8. The method of claim 7, wherein the lower load threshold and the upper load threshold are the same.

9. The method of claim 7, wherein deactivating the first cylinder comprises discontinuing spark ignition in the first cylinder.

10. The method of claim 7, further comprising:
    above the upper load threshold, maintaining an outlet valve of a third cylinder closed during a full compression stroke;
    below the lower load threshold, deactivating the third cylinder and opening the outlet valve of the third cylinder during a compression stroke; and
    regardless of load, maintaining an outlet valve of a fourth cylinder closed during a full compression stroke.

11. The method of claim 7, further comprising, below a threshold exhaust temperature closing the outlet valve of the first cylinder during the compression stroke.

12. The method of claim 7, further comprising reducing a quantity of fuel injected during a selective deactivation mode.

13. The method of claim 7, further comprising injecting fuel into the first cylinder during an expansion stroke.

14. A method for an engine comprising:
    below a lower load threshold, deactivating spark ignition at each odd-numbered cylinder in a firing order of a four cylinder engine;
    injecting fuel into a combustion chamber of the odd-numbered cylinders during a compression stroke; and
    when deactivated, opening an outlet valve of the odd-numbered cylinders during the compression stroke to deliver an air-fuel mixture to an exhaust tract, wherein the outlet valve of the odd-numbered cylinder is open for an entire duration of the compression stroke of the odd-numbered cylinder.

15. The method of claim 14, further comprising maintaining closure of an outlet valve of each even-numbered cylinder during the compression stroke.

16. The method of claim 14, wherein injecting fuel is by direct injection.

17. The method of claim 14, further comprising disabling outlet valve opening during the compression stroke of the disabled odd-numbered cylinders when a temperature in the exhaust tract is below a threshold temperature.

\* \* \* \* \*